US009646257B2

(12) United States Patent
Mytkowicz et al.

(10) Patent No.: US 9,646,257 B2
(45) Date of Patent: May 9, 2017

(54) PROBABILISTIC ASSERTIONS AND VERIFYING THEM

(71) Applicant: Microsoft Corporation, Redmond, WA (US)

(72) Inventors: Todd Mytkowicz, Redmond, WA (US); Kathryn S. McKinley, Bellevue, WA (US); Adrian Sampson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/476,194

(22) Filed: Sep. 3, 2014

(65) Prior Publication Data

US 2016/0063390 A1    Mar. 3, 2016

(51) Int. Cl.
*G06F 9/44*    (2006.01)
*G06N 7/00*    (2006.01)

(52) U.S. Cl.
CPC .................................. *G06N 7/005* (2013.01)

(58) Field of Classification Search
None
See application file for complete search history.

(56) References Cited

U.S. PATENT DOCUMENTS

| | | | |
|---|---|---|---|
| 5,297,150 A * | 3/1994 | Clark | G06F 11/3608 706/922 |
| 5,784,297 A * | 7/1998 | O'Brien et al. | 702/181 |
| 5,822,593 A * | 10/1998 | Lamping et al. | 717/161 |
| 6,353,896 B1 * | 3/2002 | Holzmann et al. | 714/38.1 |
| 7,194,380 B2 * | 3/2007 | Barrow et al. | 702/181 |
| 7,322,026 B2 * | 1/2008 | Ahluwalia | G06F 11/3672 714/E11.207 |
| 7,539,978 B1 * | 5/2009 | Haddox | G06F 11/3684 717/126 |
| 7,937,343 B2 * | 5/2011 | Zakrzewski | G06N 3/08 706/18 |
| 8,347,271 B1 * | 1/2013 | Nallasivam | 717/132 |
| 8,711,146 B1 * | 4/2014 | Miller et al. | 345/440 |
| 2002/0002698 A1 * | 1/2002 | Hekmatpour | G06F 11/263 716/106 |
| 2004/0078232 A1 * | 4/2004 | Troiani | 705/2 |
| 2004/0186684 A1 * | 9/2004 | Haft et al. | 702/179 |
| 2005/0160404 A1 | 7/2005 | Nachmanson et al. | |
| 2011/0010140 A1 * | 1/2011 | Hoitsma et al. | 703/2 |

(Continued)

OTHER PUBLICATIONS

Adje, et al., "Static Analysis of Programs with Imprecise Probabilistic Inputs", In Proceedings of Verified Software: Theories, Tools, Experiments Lecture Notes in Computer Science vol. 8164, May 17, 2013, 25 pages.

(Continued)

*Primary Examiner* — Evral E Bodden
(74) *Attorney, Agent, or Firm* — International IP Law Group PLLC

(57) ABSTRACT

Various techniques for evaluating probabilistic assertions are described herein. In one example, a method includes transforming a program, a probabilistic assertion, and an input into an intermediate representation, the intermediate representation including a Bayesian network of nodes representing distributions. The method further includes verifying a probabilistic assertion in the program using the intermediate representation.

22 Claims, 6 Drawing Sheets

(56) References Cited

U.S. PATENT DOCUMENTS

| | | | |
|---|---|---|---|
| 2011/0107307 A1* | 5/2011 | Liu | G06F 11/3664 717/125 |
| 2012/0310691 A1* | 12/2012 | Carlsson et al. | 705/7.13 |
| 2013/0304439 A1* | 11/2013 | Van der Velden | G06F 17/5009 703/6 |

OTHER PUBLICATIONS

Bakken, et al., "Data Obfuscation: Anonymity and Desensitization of Usable Data Sets", In Proceedings of IEEE Security & Privacy, vol. 2, Issue: 6, Nov. 2004, pp. 34-41.

Barthe, et al., "Probabilistic Relational Reasoning for Differential Privacy", In Proceedings of the 39th annual ACM SIGPLAN-SIGACT symposium on Principles of programming languages, Jan. 25, 2012, pp. 97-109, Philadepia, PA, USA.

Bhat, et al., "Deriving Probability Density Functions from Probabilistic Functional Programs", In Proceedings of the 19th International Conference on Tools and Algorithms for the Construction and Analysis of Systems, Mar. 16, 2013, pp. 510-524.

Bornholt, et al., "Uncertain<T>: A First-Order Type for Uncertain Data", In Proceedings of the 19th International Conference on Architectural Support for Programming Languages and Operating Systems, Mar. 1, 2014, 15 pages, Salt Lake City, UT, USA.

Carbin, et al., "Proving Acceptability Properties of Relaxed Nondeterministic Approximate Programs", In Proceedings of the 33rd ACM SIGPLAN Conference on Programming Language Design and Implementation, Jun. 11, 2012, pp. 169-180, Beijing, China.

Carbin, et al., "Verifying Quantitative Reliability of Programs that Execute on Unreliable Hardware", In Proceedings of the 2013 ACM SIGPLAN International Conference on Object Oriented Programming Systems Languages & Applications, Jun. 19, 2013, 24 pages.

Chaganty, et al., "Efficiently Sampling Probabilistic Programs via Program Analysis", In Proceedings of the 16th International Conference on Artificial Intelligence and Statistics, vol. 31 of JMLR, Apr. 2013, 8 pages, Scottsdate, AZ, USA.

Chakarov, et al., "Probabilistic Program Analysis with Martingales", In Proceedings of the 25th international conference on Computer Aided Verification, Jul. 13, 2013, 16 pages.

Chakrapani, et al., "Ultra-Efficient (Embedded) SOC Architectures based on Probabilistic CMOS (PCMOS) Technology", In Proceedings of the Conference on Design, Automation and Test in Europe, Mar. 6, 2006, 6 pages.

Che, et al., "Rodinia: A Benchmark Suite for Heterogeneous Computing", In Proceedings of the 2009 IEEE International Symposium on Workload Characterization, Oct. 4, 2009, pp. 1-11.

Chernoff, Herman, "A Measure of Asymptotic Efficiency for Tests of a Hypothesis based on the Sum of Observations", In Proceedings of the Annals of Mathematical Statistics, vol. 23, No. 4, Dec. 1952, pp. 493-507.

Clarke, et al., "Design and Synthesis of Synchronization Skeletons using Branching-Time Temporal Logic", In Workshop of Logic of Programs, May 1, 1981, 67 pages.

Diggelen, Frank Van, "GNSS Accuracy: Lies, Damn Lies, and Statistics", In GPS World, vol. 18, Issue 1, Jan. 2007, 4 pages.

Esmaeilzadeh, et al., "Architecture Support for Disciplined Approximate Programming", In Proceedings of the Seventeenth International Conference on Architectural Support for Programming Languages and Operating Systems, Mar. 3, 2012, 12 pages, London, England, UK.

Esmaeilzadeh, et al., "Neural Acceleration for General-Purpose Approximate Programs", In Proceedings of the 45th Annual IEEE/ACM International Symposium on Microarchitecture, Dec. 1, 2012, 12 pages.

Goodman, et al., "Church: a language for generative models", In Proceedings of the 24th Conference in Uncertainty in Artificial Intelligence, May 31, 2008, 10 pages.

Gordon, et al., "Probabilistic Programming", In International Conference on Software Engineering (ICSE Future of Software Engineering), May 2014, 13 pages.

Kiselyov, et al., "Embedded Probabilistic Programming", In Proceedings of the IFIP TC 2 Working Conference on Domain-Specific Languages, Jul. 17, 2009, 59 pages.

Kwiatkowska, et al., "PRISM 4.0: Verification of probabilistic real-time systems", In Proceedings of the 23rd international conference on Computer aided verification, Jul. 14, 2011, 6 pages.

Lattner, et al., "LLVM: A Compilation Framework for Lifelong Program Analysis and Transformation", In Proceedings of International Symposium on Code Generation and Optimization, Mar. 20, 2004, 494 pages.

McSherry, Frank, "Privacy Integrated Queries: An Extensible Platform for Privacy-Preserving Data Analysis", In Proceedings of the ACM SIGMOD International Conference on Management of data, Jun. 29, 2009, 12 pages, Providence, RI, USA.

Michael, et al., "Problems of Accuracy in the Prediction of Software Quality from Directed Tests", In Proceedings of the International Conference on Testing Computer Software, Aug. 25, 2004, 12 pages.

Mihajlovic, et al., "Dynamic Bayesian Networks: A State of the Art", Published on: Sep. 18, 2013, Available at: http://doc.utwente.nl/36632/1/0000006a.pdf, pp. 1-37.

Misailovic, et al., "Probabilistically Accurate Program Transformations", In Proceedings of the 18th International Conference on Static analysis, Sep. 14, 2011, 17 pages.

Mohan, et al., "GUPT: Privacy Preserving Data Analysis Made Easy", In Proceedings of the ACM SIGMOD International Conference on Management of Data, May 20, 2012, 12 pages, Scottsdale, AZ, USA.

Narayanan, et al., "Scalable Stochastic Processors", In Proceedings of the Conference on Design, Automation and Test in Europe, Mar. 8, 2010, 4 pages.

Park, et al., "A Probabilistic Language based on Sampling Functions", In Proceedings of the 32nd ACM SIGPLAN-SIGACT Symposium on Principles of Programming Languages, Jan. 12, 2005, pp. 171-182, Long Beach, CA, USA.

Pfeffer, Avi, "A General Importance Sampling Algorithm for Probabilistic Programs", In Technical Report, Retrieved on: Jun. 13, 2014, 9 pages, Cambridge, MA, USA.

Ramsey, et al., "Stochastic Lambda Calculus and Monads of Probability Distributions", In Proceedings of the 29th ACM SIGPLAN-SIGACT Symposium on Principles of Programming Languages, Jan. 16, 2002, pp. 1-12.

Reed, et al., "Distance Makes the Types Grow Stronger: A Calculus for Differential Privacy", In Proceedings of the 15th ACM SIGPLAN International Conference on Functional programming, Sep. 27, 2010, 14 pages, Baltimore, MD, USA.

Roy, et al., "Airavat: Security and Privacy for MapReduce", In Proceedings of the 7th USENIX Conference on Networked Systems Design and Implementation, Apr. 28, 2010, pp. 1-16.

Sampson, et al., "Approximate Storage in Solid-State Memories", In Proceedings of the 46th Annual IEEE/ACM International Symposium on Microarchitecture, Dec. 7, 2013, 12 pages, Davis, CA, USA.

Sampson, et al., "EnerJ: Approximate Data Types for Safe and General Low-Power Computation", In Proceedings of the 32nd ACM SIGPLAN Conference on Programming Language Design and Implementation, Jun. 4, 2011, 11 pages, San Jose, CA, USA.

Sankaranarayanan, et al., "Static Analysis for Probabilistic Programs: Inferring Whole Program Properties from Finitely Many Paths", In Proceedings of the 34th ACM SIGPLAN Conference on Programming Language Design and Implementation, Jun. 16, 2013, 12 pages, Seattle, WA, USA.

Sharir, et al., "Verification of Probabilistic Programs", In Siam Journal on Computing, vol. 13, No. 2, May 1984, pp. 292-314.

Sidiroglou, et al., "Managing Performance vs. Accuracy Trade-Offs with Loop Perforation", In Proceedings of the 19th ACM SIGSOFT Symposium and the 13th European Conference on Foundations of Software Engineering, Sep. 5, 2011, 11 pages, Szeged, Hungary.

(56) References Cited

OTHER PUBLICATIONS

Thompson, Richard B., "Global Positioning System: The Mathematics of GPS Receivers", In Mathematics Magazine, vol. 71, No. 4, Oct. 1998, pp. 260-269.
Wald, Abraham, "Sequential Tests of Statistical Hypotheses", In Proceedings of the Annals of Mathematical Statistics, vol. 16, No. 2, Jun. 1945, pp. 117-186.
Wingate, et al., "Lightweight Implementations of Probabilistic Programming Languages via Transformational Compilation", In Proceedings of the 14th International Conference on Artificial Intelligence and Statistics, May 6, 2011, pp. 770-778, Fort Lauderdale, FL, USA.
Younes, Hakan L. S., "Error Control for Probabilistic Model Checking. Verification, Model Checking, and Abstract Interpretation", In Lecture Notes in Computer Science, vol. 3855, Jan. 8, 2006, 17 pages.
Younes, et al., "Statistical Probabilistic Model Checking with a Focus on Time-Bounded Properties", In Journal of Information and Computation, vol. 204 Issue 9, May 26, 2006, pp. 1-50.
Zhu, et al., "Randomized Accuracy-Aware Pprogram Transformations for Efficient Approximate Computations", In Proceedings of the 39th annual ACM SIGPLAN-SIGACT Symposium on Principles of Programming Languages, Jan. 25, 2012, 16 pages, Philadelphia, PA, USA.
"Infer.Net", Retrieved on: Jun. 13, 2014, Available at: http://research.microsoft.com/en-us/um/cambridge/projects/infernet/.
"LLVM API Documentation", Retrieved on: Jun. 13, 2014, Available at: http://llvm.org/docs/doxygen/html/classllvm_1_1Interpreter.html.
"Prism", Retrieved on: Jun. 13, 2014, Available at: http://www.prismmodelchecker.org/.

\* cited by examiner

200

PROBABILISTIC ASSERTIONS AND VERIFYING THEM

BACKGROUND

Programmers specify assertions to guarantee that conditions are satisfied during every execution of a program. For example, assertions can indicate a null dereference or an acceptable value range for a variable. Assertions serve as a verification tool that can express logical properties to help programmers verify the correctness of a program.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An implementation can provide a system for specifying and evaluating a probabilistic assertion. The system includes a first module configured to transform a program, a probabilistic assertion, and an input into an intermediate representation. The system also includes a second module configured to verify a probabilistic assertion in the program by sampling the intermediate representation.

Another implementation can provide a method for evaluating probabilistic assertions. The method can include transforming a program, a probabilistic assertion, and an input into an intermediate representation, the intermediate representation comprising a Bayesian network of nodes representing distributions. The method can include verifying a probabilistic assertion in the program using the intermediate representation.

Another implementation can provide one or more computer-readable storage media for specifying and evaluating probabilistic assertions. The one or more computer-readable storage media can include a plurality of instructions that, when executed by a processor, can cause the processor to verify a probabilistic assertion in a program based on an intermediate representation.

The following description and the annexed drawings set forth in detail certain illustrative aspects of the claimed subject matter. These aspects are indicative, however, of a few of the various ways in which the principles of the innovation can be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
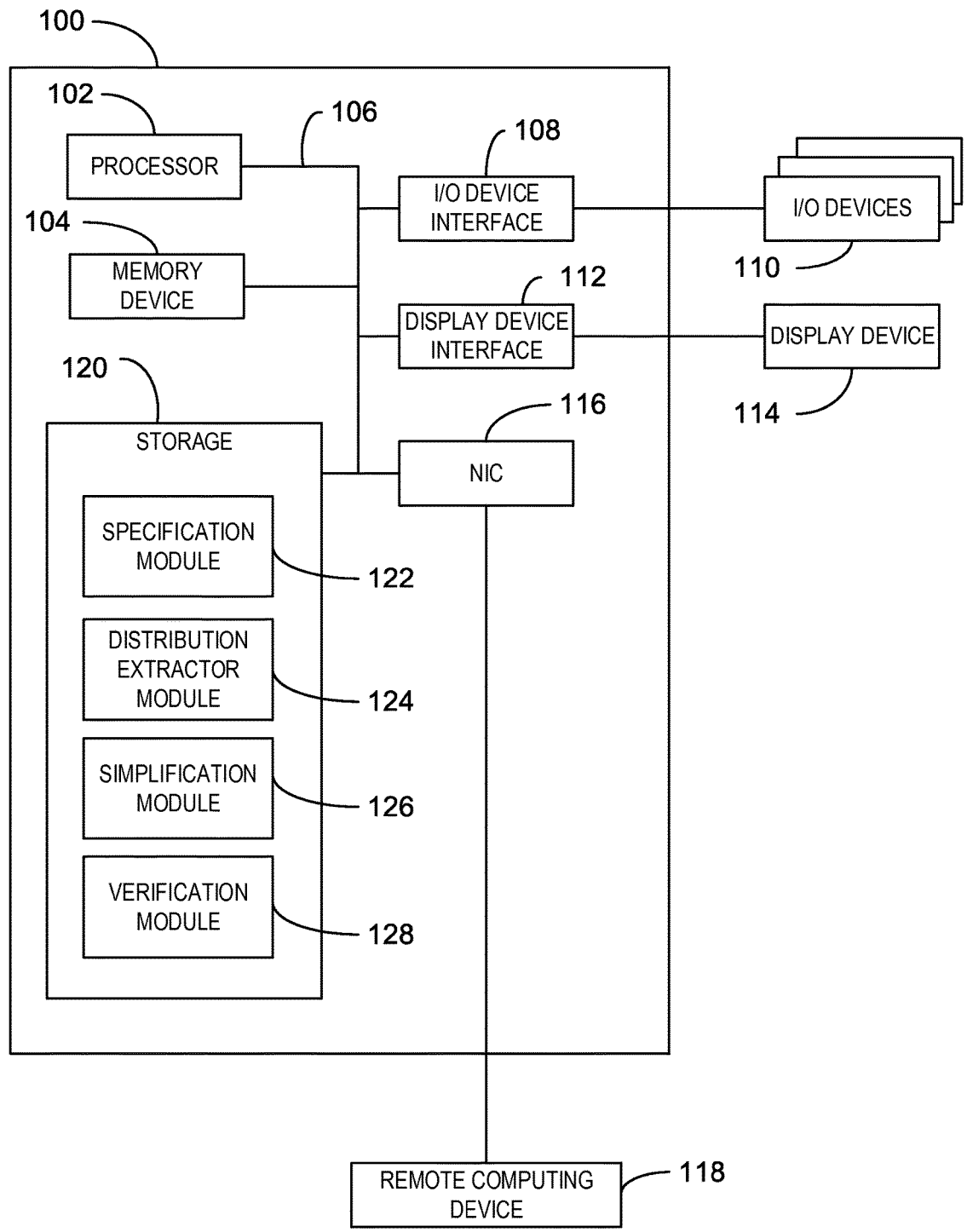
FIG. 1 is a block diagram of an example of a computing system for specifying an evaluating probabilistic assertions.

As a preliminary matter, some of the Figures describe concepts in the context of one or more structural components, variously referred to as functionality, modules, features, elements, or the like. The various components shown in the Figures can be implemented in any manner, such as software, hardware, firmware, or combinations thereof. In some implementations, various components reflect the use of corresponding components in an actual implementation. In other implementations, any single component illustrated in the Figures can be implemented by a number of actual components. The depiction of any two or more separate components in the Figures can reflect different functions performed by a single actual component. FIG. 1, discussed below, provides details regarding one system that can be used to implement the functions shown in the Figures.

Other Figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware can include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like can refer to computer-related entities, hardware, and software in execution, firmware, or combination thereof. A component can be a process running on a processor, an object, an executable, a program, a function, a subroutine, a computer, or a combination of software and hardware. The term, "processor," can refer to a hardware component, such as a processing unit of a computer system.

Furthermore, the claimed subject matter can be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. Computer-readable storage media, as used herein, do not include propagating signals. In contrast, computer-readable media, i.e., not storage media, can include communication media such as transmission media for wireless signals and the like.

Traditional assertions indicate when conditions are satisfied during the execution of a program. For example, a traditional assertion can indicate if a variable is equal to a predetermined value or within a range of predetermined values, if an operation is never executed with a null pointer, or if a state of a program is correct, among others. However, many applications use probabilistic program properties to produce results, such as the relevance of a document to a search, the distance from a mobile device to the nearest type of an establishment, or the estimated arrival of a bus, among others. Probabilistic program properties, as referred to herein, can include any suitable property during the execution of a program that can be verified based on any suitable statistical or probability related distribution. Applications that compute results based on probabilistic program properties include applications for smartphones with sensors, applications for robots, machine learning applications, and big data applications, among others. In some embodiments, applications executed with unreliable or approximate hardware can also involve probabilistic program properties.

According to implementations described herein, probabilistic program properties in a program can be expressed and verified with probabilistic assertions and an intermediate representation of the program. As used herein, a probabilistic assertion refers to an operation that expresses if a probabilistic program satisfies a predetermined condition. This condition can be explicit in a program statement or can be inferred from variable uses or program outputs. As used herein, a probabilistic program refers to one or more statements followed by a probabilistic assertion. For example, a probabilistic assertion can include an expression that can be evaluated to true or false in determining if the expression satisfies a condition for a particular execution of the program with a given probability and confidence. In some embodiments, the probabilistic assertion can be evaluated and verified using an intermediate representation of a program. For example, the intermediate representation can be a Bayesian symbolic representation of a program. In some examples, the Bayesian symbolic representation can include nodes representing distributions, non-linear operators, and conditional expressions, among others.

In some embodiments, the intermediate representation allows for efficient evaluation and verification of probabilistic program properties using statistical simplification and hypothesis testing, which are discussed in greater detail below in relation to FIGS. 4 and 5. For example, statistics can be used to simplify the intermediate representation and efficiently compute probabilities for verification of probabilistic assertions either directly or with sampling. In some examples, if a probability distribution is simplified into a simple distribution such as a Bernoulli distribution, then the probabilities can be computed directly and the probabilistic assertion can be verified precisely, and without sampling. In some cases, for more complex distributions, the probabilities can be computed by sampling a threshold number of samples based on confidence and accuracy. A hypothesis test can then be performed to statistically verify the probabilistic assertion. Moreover, the techniques described herein can verify that assertions meet predefined criteria in any arbitrary program, not just probabilistic programs. In addition, the present techniques can verify assertions based on any type of program invariant, wherein the kind of the invariant can be specified by a probabilistic assertion variable.

FIG. 1 is a block diagram of an example of a computing system for specifying and evaluating probabilistic assertions. The computing system 100 can be, for example, a personal mobile device, laptop computer, desktop computer, tablet computer, computer server, or mobile phone, among others. The computing system 100 can include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read-only memory, flash memory, or any other suitable memory systems. The memory device 104 can include computer-readable storage media that includes volatile memory and nonvolatile memory. The instructions that are executed by processor 102 can be used to evaluate probabilistic assertions.

The processor 102 can be connected through a system bus 106 (e.g., PCI®, PCI-Express®, etc.) to an input/output (I/O) device interface 108 adapted to connect the computing system 100 to one or more I/O devices 110. The system bus 106 can be any of several types of bus structure, including the memory bus or memory controller, a peripheral bus or external bus, and a local bus using any variety of available bus architectures known to those of ordinary skill in the art. The I/O devices 110 can include, for example, a keyboard, a gesture recognition input device, a voice recognition device, and a pointing device, wherein the pointing device can include a touchpad or a touchscreen, among others. The I/O devices 110 can be built-in components of the computing system 100, or can be devices that are externally connected to the computing system 100.

The processor 102 can also be linked through the system bus 106 to a display device interface 112 adapted to connect the computing system 100 to a display device 114. The display device 114 can include a display screen that is a built-in component of the computing system 100. The display device 114 can also include a computer monitor, television, or projector, among others, that is externally connected to the computing system 100. A network interface card (NIC) 116 can also be adapted to connect the computing system 100 through the system bus 106 to a remote computing device 118.

The storage 120 can include a hard drive, an optical drive, a USB flash drive, an array of drives, or any combinations thereof. The storage 120 can include a specification module 122, a distribution extractor module 124, a simplification module 126, and a verification module 128. In some implementations, the specification module 122 can receive a program, probabilistic assertions, and input. In some implementations, the specification module 122 can express probabilistic program properties as probabilistic assertions. Thus, the probabilistic assertion can also correspond to a probabilistic property of the program. In some implementations, the distribution extractor module 124 can transform a program, a probabilistic assertion, and inputs into an intermediate representation. For example, the distribution extractor module 124 can receive a program containing probabilistic assertions and inputs. An input can include a concrete value or distribution for a variable and/or statistical information that can be used to test an expression for a given value or range of values as explained in detail in FIG. 3 below. In some examples, the distribution extractor module 124 can represent probability distributions as expression trees to build a Bayesian network. As used herein, a Bayesian network is a directed acyclic graph wherein nodes are random variables and edges between nodes and represent conditional dependence between those random variables. An expression tree, as used herein, is a subset of a Bayesian network wherein each "variable" in the expression tree symbolically represents a distribution.

As discussed above, traditional assertions do not properly express the correctness of a variable selected from a probability distribution. However, many applications use variables based on distributions in order to generate results. The distribution extractor module 124 can therefore represent probabilistic program properties as probabilistic assertions, which can contain probability parameters and confidence parameters. In addition, these program properties may be directly expressed as code in a program. A probability parameter can contain a distribution representing a range of possible values for a variable. A confidence parameter can indicate the reliability of a probability parameter. For example, a confidence parameter of 95% can indicate that a value to be tested by a probabilistic assertion is expected to fall within a given distribution 95% of the time. In some examples, the distribution extractor module 124 can transform a program into a Bayesian network, in the form of a direct, acyclic graphical model of nodes. The nodes in the Bayesian network can represent random variables from the program and edges between the nodes can represent conditional dependencies between the random variables. In some implementations, the distribution extractor module 124 can marginalize probabilistic conditionals to produce unconditional distributions. Marginalization is the process of factoring out the influence of a particular variable. For example, given the code: if (a) c=0 else c=1, if 'a' is a probability from 0 to 1, the distribution extractor module 124 can factor out the influence of 'a' by folding it into the definition of the variable 'c,' resulting in: c=a*0+(1−a)*1. The variable 'c' can take on the value 0 with probability 'a' and value 1 with probability 1−a. In some implementations, the distribution extractor module can also represent loop bodies as supernodes, as discussed in the description of FIG. 3 below.

In some implementations, the simplification module 126 can simplify the intermediate representation. For example, the simplification module 126 can simplify the intermediate representation using one or more statistical rules. In some examples, the simplification module 126 can simplify inequality probabilities using the cumulative distribution function (CDF). In some examples, the simplification module 126 can reduce summations using the central limit theorem. In some implementations, the simplification module 126 can simplify the intermediate representation of a program using algebraic equations on known distributions. For example, the simplification module 126 can use closed-form algebraic operations on common Gaussian, uniform, and/or Bernoulli distributions. A closed-form operation as used herein includes operations such as addition, subtraction, multiplication and division. In some implementations, the simplification module 126 can compute expected values and variances of probabilistic distributions. An expected value, as used herein, refers to a weighted average of all possible values of a distribution. Variance, as used herein, refers to the expected value of the squared deviation of a variable's value from the variable's expected value. In some examples, the simplification module 126 can use the linearity of expectation to produce simpler distributions with the same expected values as the original distributions. The simplification module 126 can simplify comparisons using statistical inequalities. For example, the simplification module 126 can simplify comparisons using Chebyshev's Theorem, as discussed in FIG. 4.

In implementations, the verification module 128 can verify probabilistic assertions using the simplified intermediate representation. In some implementations, verification module 128 can report a probability from a simplified distribution. For example, the verification module 128 can report a probability from a simplified Bernoulli distribution.

In some implementations, the verification module 128 can sample a simplified intermediate representation to estimate its probability. For example, the verification module 128 can use a two-sided Chernoff bound to calculate a number of samples to satisfy a given level of confidence and accuracy. The verification module 128 can then take a corresponding amount of samples to meet a threshold level of confidence and accuracy. In some examples, the verification module 128 can also use acceptance sampling to bound errors in verification. As used herein, acceptance sampling refers to a form of hypothesis testing used to bound errors. For example, a hypothesis test can check whether a probabilistic assertion's probability exceeds a threshold probability at a given confidence level. In implementations, if an estimated probability is more likely than not to hold, then the verification module 128 can verify the probabilistic assertion as true. If the estimate is more likely to not hold, then the verification module 128 can verify the probabilistic assertion as false. In some examples, if the verification module 128 is unable to verify the probabilistic assertion as true or false, then the verification module 128 can prompt the user to increase confidence, accuracy, or both, in the probabilistic assertion or to the correct the program to match the desired probabilistic assertion. For example, the verification module 128 can prompt for a choice between increasing the confidence or accuracy of the verification, or both, to verify the probabilistic assertion when the accuracy includes the value being tested, as discussed in FIG. 5.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the distribution extractor module 124, the simplification module 126, and the verification module 128 can be partially, or entirely, implemented in hardware and/or in the processor 102. For example, the functionality can be implemented with an application specific integrated circuit, in logic implemented in the processor 102, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 2:
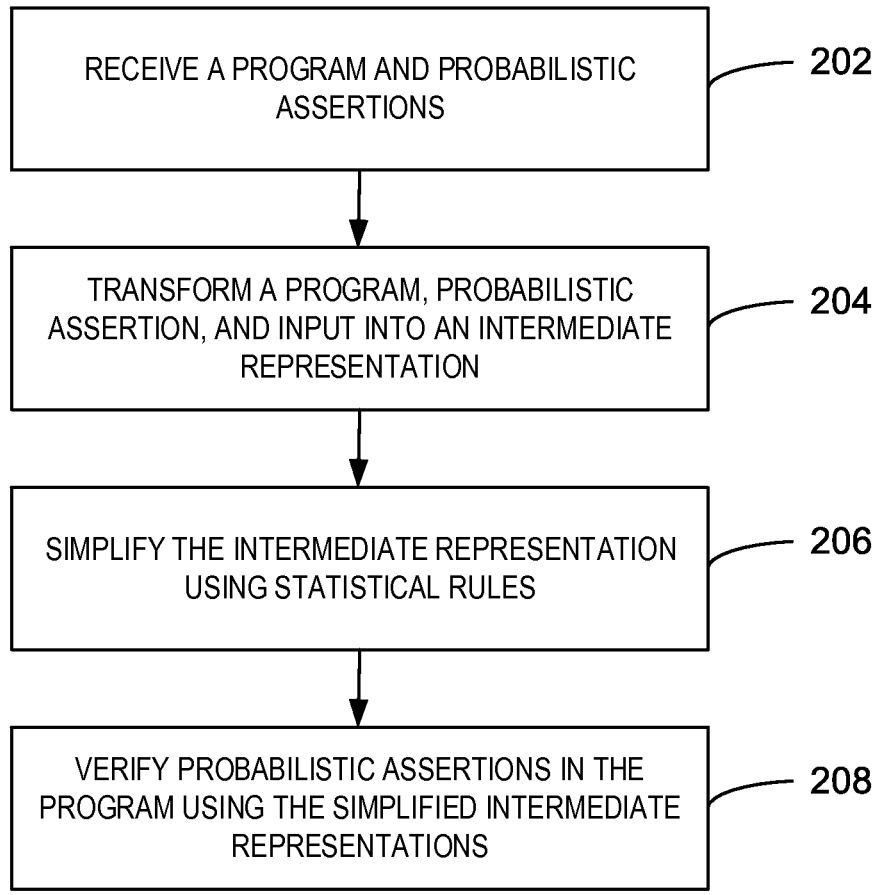
FIG. 2 is a process flow diagram of an example method for evaluating probabilistic assertions.

FIG. 2 is a process flow diagram of an example method for evaluating probabilistic assertions. The method of FIG. 2 is referred to generally by the reference number 200.

At block 202, the specification module 122 can receive a program with probabilistic assertions. For example, the program may have probabilistic assertions explicitly written into the program's code. In some examples, the specification module 122 can represent probabilistic program properties as probabilistic assertions.

At block 204, the distribution extractor module 124 can transform a program, probabilistic assertion, and input into an intermediate representation. In implementations, the intermediate representation can contain symbolic representations. For example, a symbolic representation can be a Bayesian network of nodes that are used to evaluate a probabilistic assertion. The Bayesian network can be a directed, acyclic graphical model that corresponds to a portion of the program contributing to an expression to be evaluated. In some examples, the nodes in the Bayesian network can represent random variables from the program and the edges between the nodes can represent conditional dependencies between those random variables. In some examples, any suitable number of the variables can be treated as distributions. For example, constants can be treated as point-mass distributions. In some examples, known distributions, such as uniform distributions, Gaussian distributions, or other programmer specified distributions, can be symbolically represented. In some examples, distributions can be derived from point-mass and known distributions. In some implementations, the distribution extractor module 124 can perform a forward execution over the program evaluating discrete computations and introducing symbolic values to represent probabilistic values. For example, the distribution extractor module 124 can execute conditionals, loops and external code as discussed in FIG. 3 below.

At block 206, the simplification module 126 can simplify the intermediate representation using one or more statistical rules. For example, the simplification module 126 can use statistical rules or properties to simplify distributions. In some examples, the simplification module 126 can simplify algebraic operations on known distributions. In some examples, the simplification module 126 can use the cumulative distribution function (CDF) for known distributions to simplify inequalities. In some examples, the simplification module 126 can use statistical rules to compute expected values and variances of distributions to further simplify the Bayesian networks. These methods of simplifying the intermediate representation are discussed in detail in FIG. 4 below.

At block 208, the verification module 128 can verify probabilistic assertions using the simplified intermediate representations. In some examples, the verification module 128 can directly evaluate a probabilistic assertion using the simplified intermediate representation. For example, if a simple Bernoulli distribution with a known probability is produced by the simplification module 126, then the verification module 128 can report the probability from the simplified Bernoulli distribution to verify the probabilistic assertion directly.

In some examples, the verification module 128 can sample the simplified distributions to estimate their probability. For example, the simplification module 126 may not be able to completely simplify a probability distribution. Simplifying a probability distribution can include rewriting the distribution as a function or collection of distributions. For example, deep trees of associative and/or commutative arithmetic operators can be simplified into sum and product nodes with many children. The verification module 128 can then use sampling to estimate the probabilities using methods further described in FIG. 5 below. If the estimated probability is more likely than not, then the verification module 128 verifies the probabilistic assertion as true. If the estimated probability is less likely than not, then the verification module 128 verifies the probabilistic assertion as false. If a probabilistic assertion is verified as false, the program can be changed to meet the desired specification or correctly express the probabilistic property of the program.

The process flow diagram of FIG. 2 is not intended to indicate that the operations of the method 200 are to be executed in any particular order, or that all of the operations of the method 200 are to be included in every case. For example, block 206 may not be performed, and at block 208 the verification module 128 can verify probabilistic assertions using the intermediate representations. Further, any number of additional operations can be included within the method 200, depending on the specific application.

Figure 3:
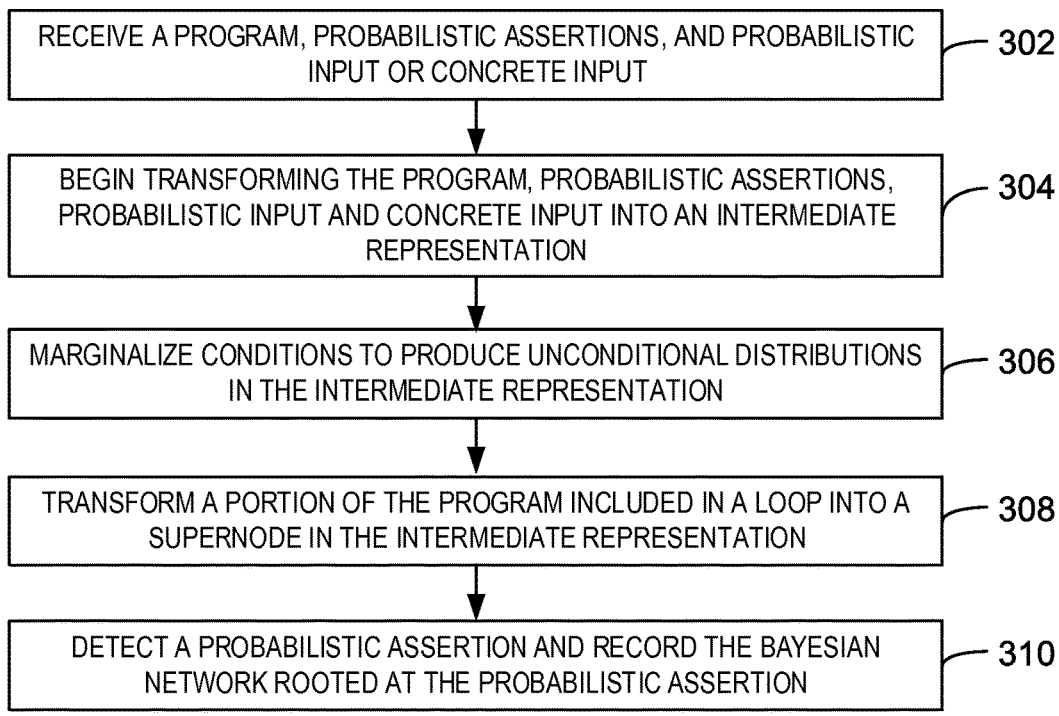
FIG. 3 is a detailed process flow diagram of an example method for transforming programs into intermediate representations.

FIG. 3 is a detailed process flow diagram of an example method for transforming programs into an intermediate representation. The method of FIG. 3 is referred to generally by the reference number 300.

At block 302, the distribution extractor module 124 receives a program, a probabilistic assertion, and probabilistic input or concrete input. In some embodiments, the probabilistic input and the concrete input can be used to evaluate probabilistic assertions includes in the program. The probabilistic input, as referred to herein, can include any suitable number of data values or statistical information that can be used to evaluate random variables in probabilistic assertions. In some examples, a random variable includes any suitable variable assigned a random value from a distribution or any other suitable source. The concrete input, as referred to herein, can include data values used to evaluate non-random variables in probabilistic assertions. In some examples, a non-random variable can include a known data value that is not selected from a distribution or random source.

In some embodiments, the distribution extractor module 124 can use any suitable combination of probabilistic input and concrete input to evaluate a probabilistic assertion. For example, a probabilistic assertion in a program can take the form "passert e, p, cf." The probabilistic assertion can be used to determine that the probability that the Boolean expression "e" evaluates to a true value in a given execution of the program is at least "p" with confidence "cf," wherein the "p" value and the "cf" value are received as probabilistic input In some examples, the parameters "p" and "cf" can be optional and can have default values. For example, probability "p" can default to 0.5, representing a 50% probability, or any other suitable default value. In some examples, confidence "cf" can default to 95%, or any other suitable default value. Allowing such probabilistic assertions to be written directly into code results in a much more efficient analysis. In addition, any output probabilistic value or other probabilistic value may be verified. In some examples, probabilistic and concrete input can be detected from user input. For example, user input can include concrete values, such as data values for non-random variables, or probabilistic input, such as distributions for random variables, to be used for testing an expression.

At block 304, the distribution extractor module 124 can begin transforming the program, probabilistic input, and concrete input into an intermediate representation. For example, the intermediate representation can include expression trees. In some embodiments, the probabilistic input can include probability distributions, which are transformed into symbolic values. As discussed above, a symbolic value can be a pointer into a Bayesian network. In some implementations, the distribution extractor module 124 maintains a symbolic heap and stack for organizing the symbolic values. Both the heap and the stack can be mappings from names to values. A heap can map values to memory addresses. A stack can map values to an actual local variable name in the program text. In some examples, when operating on non-probabilistic values, the distribution extractor module 124 can avoid constructing nodes in the Bayesian network and can instead maintain a concrete heap and stack.

In some examples, the nodes of the Bayesian network can be samples, arithmetic operations, variables, comparisons, constants, or conditionals. A Bayesian network can be populated with nodes whenever the distribution extractor module 124 executes any expression in the program. The distribution extractor module 124 can produce a node for each program expression with edges representing conditional dependencies. For example, a node might have no out-edges or it might be created with edges pointing to other previously-created nodes. A conditional, as used herein, refers to a kind of expression that can have three children: a "condition" child, a "true value" child, and a "false value" child. A conditional can correspond to an if/then/else statement in a programming language. In implementations, the distribution extractor module 124 can generate expression trees based on conditional expressions identified within the program. In some examples, the distribution extractor module 124 can also coalesce identical expression trees in the Bayesian network. For example, given sums of samples $e_1=\{s_1+s_2\}$ and $e_2=\{(s_1+s_2)+s_3\}$, the sum e2 can be represented as a sum node with two children, one child of which is the node for sum $e_1$. By coalescing identical express trees in this way, the extractor module 124 can conserve storage space.

At block 306, the distribution extractor module 124 can marginalize conditions to produce unconditional distributions in the intermediate representation. As used herein, marginalization refers to computing a marginal distribution by integrating over a joint probability distribution. For example, given two jointly distributed random variables X and Y, the conditional probability distribution of Y given X is the probability distribution of Y when X is known to be a particular value. In some examples, the conditional probabilities can be expressed as functions containing the unspecified value x of X as a parameter. An unconditional distribution, as referred to herein, includes distributions that do not contain conditions. For example, given two conditional probability distributions for conditional probability distribution Pr[B] for B conditioned on both possible values for A, probability distribution Pr[C] when A is true and probability distribution Pr[D] when A is false:

$$Pr[B|A=\text{true}]=Pr[C] \quad \text{(Eq. 1)}$$

$$Pr[B|A=\text{false}]=Pr[D] \quad \text{(Eq. 2)}$$

An unconditional distribution for P[B] can be written as:

$$Pr[B]=Pr[C]\cdot Pr[A=\text{true}]+Pr[D]\cdot(1-Pr[A=\text{true}]) \quad \text{(Eq. 3)}$$

Thus, marginalization can result in computing the distribution for probability distribution B as a function of the distributions for A, C, and D.

In some implementations, conditionals can appear as branches in an intermediate representation of a program. In some examples, the distribution extractor module 124 analyzes conditionals by executing both sides of a branch and merging the resulting heap updates. In some examples, the distribution extractor module 124 can buffer all heap writes containing executed branches in a hash table. In some examples, when the distribution extractor module 124 encounters a branch, it can find the immediate post-dominator in the control flow graph and begins by taking the branch. For example, a node z is said to post-dominate a node n if all paths to the exit node of the graph starting at n must go through z. Similarly, the immediate post-dominator of a node n is the postdominator of n that doesn't strictly postdominate any other strict postdominators of n. When the immediate post-dominator is reached, the distribution extractor module 124 can return to the branch and can follow a direction not yet taken. In some examples, writes during this second phase may not be buffered. When the immediate post-dominator is reached a second time, the buffered writes can be merged into the heap using conditional nodes. In some examples, the distribution extractor module 124 can nest conditions using a scoped hash table.

At block 308, the distribution extractor module 124 can transform a portion of the program included in a loop into a supernode in the intermediate representation. A supernode, as referred to herein, includes a symbolic representation of a loop body in the intermediate representation. In some implementations, variables read within the body of the loop can be represented as edges into the supernode and variables written by the body of the loop can be represented as edges out of the supernode. In some examples, loops with probabilistic conditions can, in general, run for an unbounded number of iterations and induce cycles that could break the acyclic assumptions of a Bayesian network.

At block 310, the distribution extractor module 124 can detect a probabilistic assertion and records the Bayesian network rooted at the probabilistic assertion. The simplification module 126 can simplify the recorded Bayesian network as discussed in FIG. 4 below.

The process flow diagram of FIG. 3 is not intended to indicate that the operations of the method 300 are to be executed in any particular order, or that all of the operations of the method 300 are to be included in every case. For example, when conditionals or loops are based on purely discrete values, the distribution extractor module 124 can proceed down one side of the control flow branch. In addition, when operating on non-probabilistic values, the distribution extractor module 124 can avoid constructing nodes in the Bayesian network and instead maintain a concrete heap and stack. Also, blocks 304-308 can occur in any order prior to block 310. Further, any number of additional operations can be included within the method 300, depending on the specific application.

Figure 4:
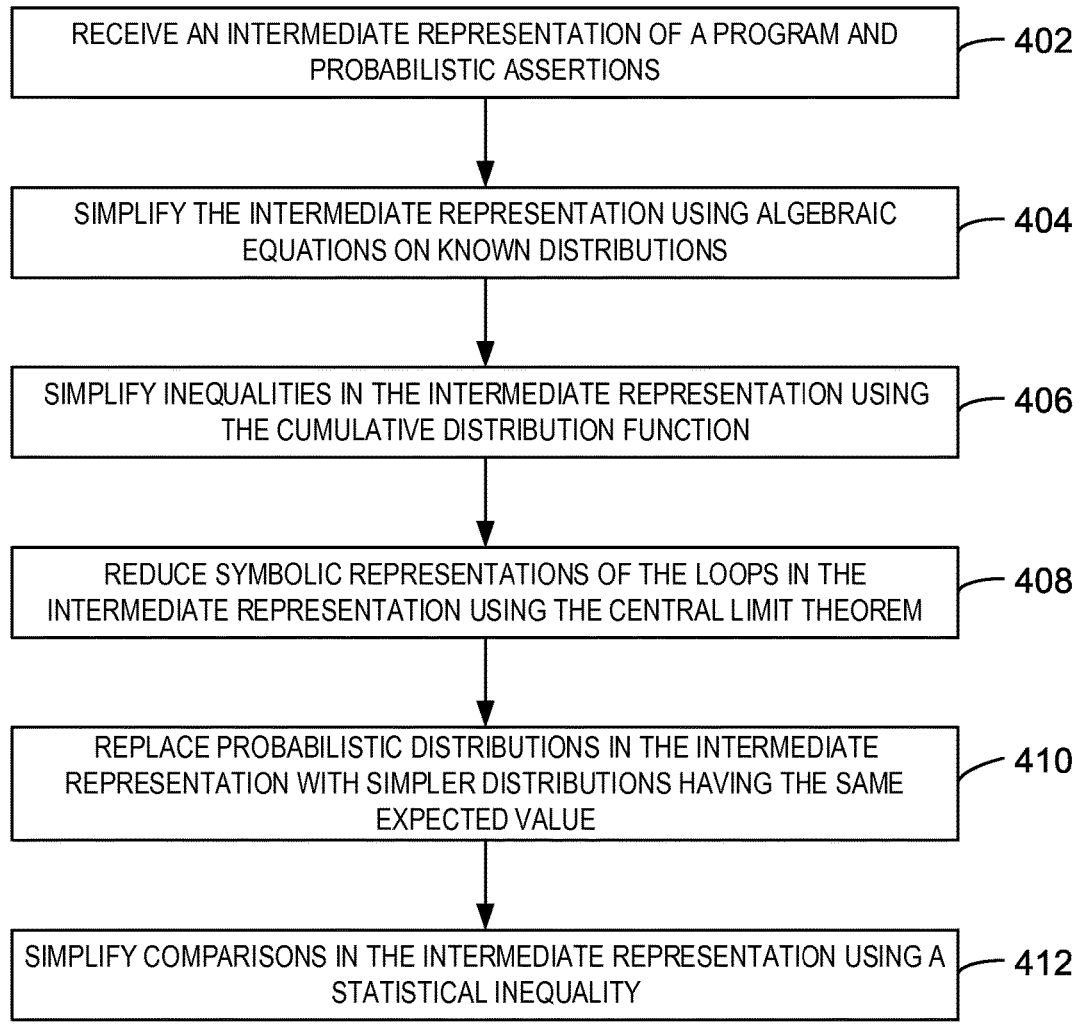
FIG. 4 is a detailed process flow diagram of an example method for simplifying intermediate representations.

FIG. 4 is a detailed process flow diagram of an example method for simplifying intermediate representations. The method of FIG. 4 is referred to generally by the reference number 400.

At block 402, the simplification module 126 can receive an intermediate representation of a program and probabilistic assertions. For example, the intermediate representation can include an expression tree representing a portion of a program. In some examples, the expression tree can be a Bayesian network rooted at a particular probabilistic assertion. As discussed above, the expression tree can include any suitable number of nodes and edges. An edge, as referred to herein, indicates a relationship between two nodes. For example, an edge can indicate a parent-child relationship or conditional dependencies between nodes. For example, the intermediate representation of the program can be a Bayesian network created and recorded by the distribution extractor module 124 in method 300 above. In implementations, the simplification module 126 can receive the intermediate representation from the distribution extractor module 124 and can simplify the intermediate representation using various statistical operations described below.

At block 404, the simplification module 126 can simplify the intermediate representation using algebraic equations on known distributions. For example, the known distributions can be common Gaussian, uniform, and/or Bernoulli distributions. In some examples, the simplification module 126 simplifies closed-form addition of Gaussians and scalar shift or scaling of Gaussian, uniform, or Bernoulli distributions.

In some examples, the simplification module 126 can simplify the sum of uniform distributions as an Irwin-Hall distribution.

At block 406, the simplification module 126 simplifies inequalities in the intermediate representation using the Cumulative Distribution Function (CDF). As used herein, an inequality refers to a relation between two values that are different. The CDF for a real-valued random variable X is the function $F_X(x)$ such that:

$$F_X(x) = Pr[X < x] \quad \text{(Eq. 4)}$$

Eq. 1 thus provides a closed-form mechanism to evaluate whether a distribution is less than a constant x.

At block 408, the simplification module 126 reduces symbolic representations of the loops in the intermediate representation using the central limit theorem (CLT). The CLT states that the arithmetic mean of a sufficiently large number of iterates of independent random variables, each with a well-defined expected value and well-defined variance, will be approximately normally distributed. An iterate, as used herein, refers to the result of one iteration or randomly generated observation. The sum of a large number of independently random variables, with finite variance, therefore tends to a single Gaussian distribution. In some examples, the simplification module 126 uses the CLT to reduce representations of loops which compute a reduction over random variables into a single closed-form Gaussian distribution, which samples from the body of the loop.

At block 410, the simplification module 126 replaces probabilistic distributions in the intermediate representation with simpler distributions having the same expected value. In some examples, the simplification module 126 uses the linearity of expectation to produce simpler distributions with the same expected value as the original distribution. For example, a Bayesian network D+D, which indicates the addition of two independent samples from D, is not equivalent to the Bayesian network induced from 2·D, indicating the multiplication of one independent sample by two. A simplification resembling traditional strength reduction therefore does not compute the correct distribution. However, these two Bayesian networks have the same expected value. Specifically, expectation has the property E[A+B]=E[A]+E[B] for all distributions A and B. Thus, in some examples, the simplification module 126 can simplify D+D to 2·D.

At block 412, the simplification module 126 simplifies comparisons in the intermediate representation using a statistical inequality. For example, the statistical inequality can be Chebyshev's inequality. Chebyshev's inequality states:

$$Pr[|X - \mu| \ge k\sigma] \le \frac{1}{k^2} \quad \text{(Eq. 5)}$$

In any probability distribution, "nearly all" values are close to the mean. Specifically, no more than $1/k^2$ of the distribution's values can be more than k standard deviations away from the mean. In other words, at least $1-1/k^2$ of the distribution's values are within k standard deviations of the mean. Thus, given an expectation $\mu$ and variance $\sigma^2$ of a random variable, Chebyshev's inequality gives a bound on the probability that a sample of a random variable deviates by a given number of standard deviations from its expected value. For example, for a program with the probabilistic assertion "passert x>=5," the distribution extractor module 124 can produce a Bayesian network of the form X≥5. Using the linearity of expectation, the simplification module 126 can compute n=1 and σ=3 for X. Using k=2, gives the bound:

$$Pr[X \ge 5] \le \frac{1}{2^2} \quad \text{(Eq. 6)}$$

Thus, the simplification module 126 can produce a bound of ¼ on the probability and thus a bound on the expectation of the inequality X≥5. The bound indicates an upper limit on the probability. Additionally, in some embodiments, other techniques can similarly be used to simplify the comparisons. For example, a Marcinkiewicz-Zygmund inequality, a multi-dimensional Chebyshev's inequality, or a Samuelson's inequality, among others, can be used to simplify the comparisons.

The process flow diagram of FIG. 4 is not intended to indicate that the operations of the method 400 are to be executed in any particular order, or that all of the operations of the method 400 are to be included in every case. For example, a given application can skip one or more simplification operations of blocks 404-412. Moreover, some simplification such as arithmetic identities can be performed on-the-fly during execution while others, such as the central limit theorem transformation, can operate on the complete Bayesian network. Further, any number of additional operations can be included within the method 400, depending on the specific application.

Figure 5:
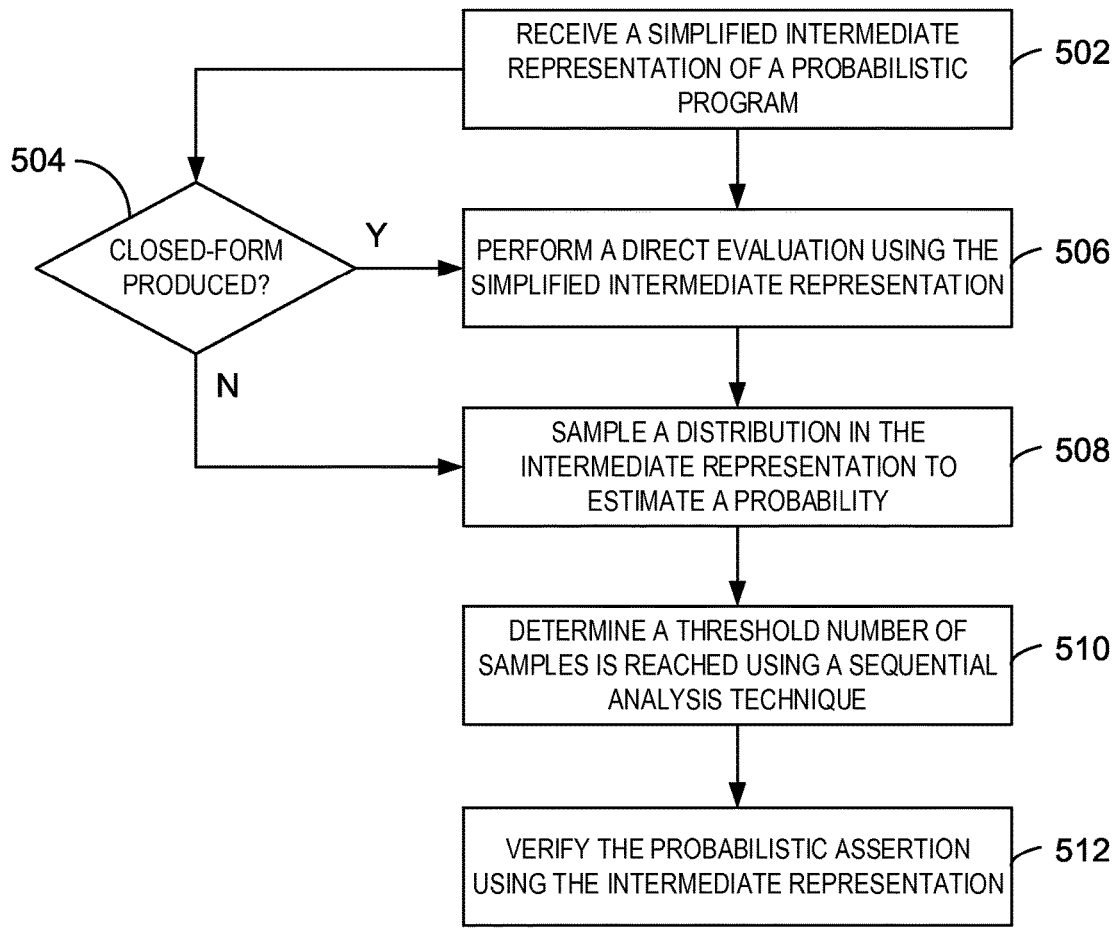
FIG. 5 is a detailed process flow diagram of an example method for verifying probabilistic assertions.

FIG. 5 is a detailed process flow diagram of an example method for verifying probabilistic assertions. The method of FIG. 5 is referred to generally by the reference number 500.

At block 502, the verification module 128 can receive a simplified intermediate representation of a probabilistic program. For example, the simplified intermediate representation can be an intermediate representation created by the simplification module 126 in method 400 above.

At diamond 504, the verification module 128 can determine whether a closed-form representation was produced by the simplification module 126. If the simplification module 126 simplified the program down to a single node, the verification module can interpret the single node without sampling because it represents a known distribution. For example, the closed-form representation can be a Gaussian, Uniform, or Bernoulli distribution. In some examples, if the simplified intermediate representation is closed-form, then the method can proceed to block 506. In some examples, if the simplified intermediate representation contains more than one node and is therefore not closed-form, then the method can proceed to block 508.

At block 506, the verification module 128 can perform a direct evaluation using the simplified intermediate representation. In some examples, the verification module 128 can report the probability from a closed-form representation of a probabilistic distribution. For example, the simplifications on the probability distributions can allow the verification module 128 to fully evaluate a probability assertion. For example, the central limit theorem (CLT) can be used to replace a sum with a Gaussian distribution, which allows the simplification module 126 to produce a simple Bernoulli distribution with a known probability. In some examples, the verification module 128 can report the probability from the simple Bernoulli distribution to directly evaluate the probabilistic assertion.

At block 508, the verification module 128 can sample a distribution in the intermediate representation to estimate a probability. In some examples, a simplified distribution may not be completely simplified into a simple distribution. For example, the resulting intermediate representation can include complex distributions that the verification can sample to estimate probability. In implementations, the distribution extractor module 124 also treats loops as black boxes that generate samples. In some examples, the verification module 128 therefore can allow the loop to run for an unbounded but finite number of iterations to generate the samples. In some examples, the verification module 128 can use acceptance sampling to bound any error in its verification. The verification module 128 can take advantage of the fact that probabilistic assertion statements are logical properties over random variables and therefore Bernoulli random variables. For example $X_i$~Bernoulli(p) can represent an independent sample of a probabilistic assertion where p is the true probability of the probabilistic assertion to be estimated by sampling. Eq. 4 can then represent the sum X of n independent samples of the probabilistic assertion:

$$X=X_1+X_2+\ldots+X_n \quad \text{(Eq. 7)}$$

Furthermore, Eq. 5 can represent an estimate of p, or the empirical expected value of p, E:

$$E[X]=\overline{X}=X/n \quad \text{(Eq. 8)}$$

In some examples, to bound error E in the sampling estimate, the verification module 128 computes:

$$\Pr[\overline{X}\epsilon[p-\epsilon,p+\epsilon]\geq 1-\alpha] \quad \text{(Eq. 9)}$$

where $\alpha$ is the chance that the estimate p is wrong. Otherwise, the verification module's 128 estimate E is within an error E of the true probability p. In some examples, when estimating p via sampling, the verification module 128 mitigates against sources of error due to sampling using the estimated probability E of probability p and the extent to which the estimate E is accurate. The likelihood of a good estimate, or confidence of the estimate, can be increased by increasing the value of $\alpha$. Moreover, the accuracy of the estimate can be increased by decreasing the value of error $\epsilon$. In some examples, given values for $\alpha$ and $\epsilon$, the verification module 128 uses a two-sided Chernoff bound to compute n, or the number of samples to be taken to satisfy a given level of confidence and accuracy. A Chernoff bound can give exponentially decreasing bounds on tail distributions of sums of independent random variables. Specifically, the two-sided Chernoff bound is an upper-bound on the probability that an estimate $\overline{X}$ deviates from its true mean p, according to Eq. 7:

$$\Pr[|\overline{X}-p|\geq \epsilon p]\leq 2e^{-\frac{\epsilon^2}{2+\epsilon}np} \quad \text{(Eq. 10)}$$

However, this bound is an over-approximation of the true number of samples to be taken to achieve a given level of confidence and accuracy as it does not take into account how good an estimate $\overline{X}$ is of the true mean p. Therefore, the approximation can be iteratively computed as discussed in block 510 to reduce the amount of sampling.

At block 510, the verification module 128 can determine a threshold number of samples is reached using a sequential analysis technique. For example, the verification module 128 can use Wald's sequential sampling plan to iteratively compute an approximation based on Eq. 8 after each sample:

$$\Pr[\overline{X}\epsilon[p-\epsilon,p+\epsilon]]\geq 1-\alpha \quad \text{(Eq. 11)}$$

Because Wald's sequential sampling plan uses the current estimate of $\overline{X}$ relative to p, Wald's sequential sampling plan can allow the verification module 128 to stop sampling well before reach the upper bound while maintaining confidence and accuracy. In some implementations, other techniques can be used to compute the approximation.

At block 512, the verification module 128 can verify the probabilistic assertion using the intermediate representation. As discussed above, if the estimate is more likely than not to fall within a given distribution, then the verification module 128 can verify the probabilistic assertion as true. If the estimate is more likely to not fall within the distribution, then the verification module 128 can verify the probabilistic assertion as false. In some examples, a probabilistic assertion may be unable to verify a probabilistic assertion because its accuracy contains the value being tested. The verification module 128 can thus prompt a user to either increase confidence or accuracy, or both.

The process flow diagram of FIG. 5 is not intended to indicate that the operations of the method 500 are to be executed in any particular order, or that all of the operations of the method 500 are to be included in every case. For example, in some examples, no closed form may be produced by the simplification module 126 such that the verification module 128 can directly evaluate the probabilistic assertion. In some examples, the distributions can be all simplified by the simplification module 126 to closed-form distributions such that the sampling of block 506 is not performed. Further, any number of additional operations can be included within the method 500, depending on the specific application.

Figure 6:
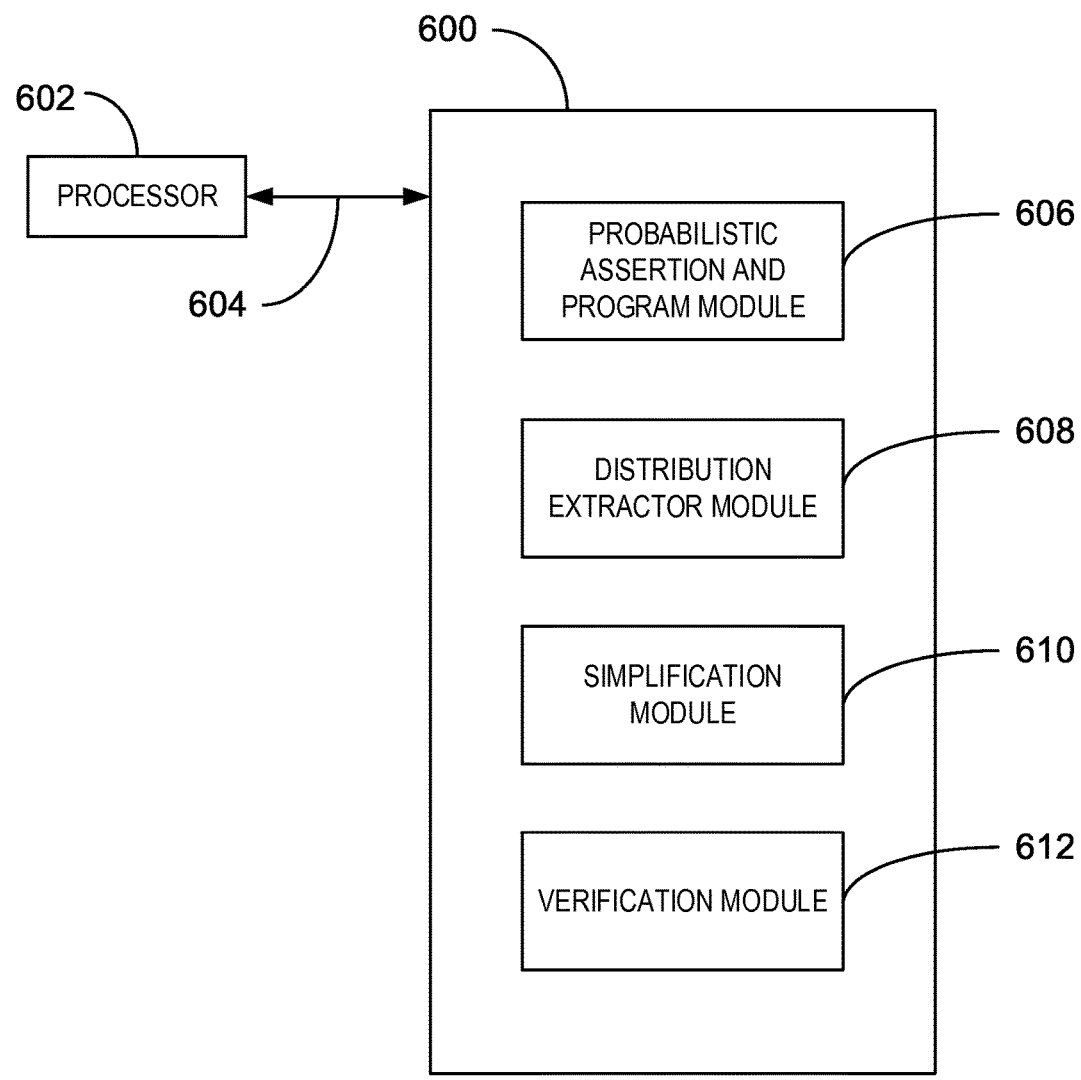
FIG. 6 is a block diagram showing a tangible, computer-readable storage media that can be used to specify and evaluate probabilistic assertions.

FIG. 6 is a block diagram showing a tangible, computer-readable storage medium that can be used to specify and evaluate probabilistic assertions. The tangible, computer-readable storage media 600 can be accessed by a processor 602 over a computer bus 604. Furthermore, the tangible, computer-readable storage media 600 can include code to direct the processor 602 to perform the current methods. For example, methods 200-500 can be performed by the processor 602.

The various software components discussed herein can be stored on the tangible, computer-readable storage media 600, as indicated in FIG. 6. For example, the tangible computer-readable storage media 600 can include a probabilistic assertion and program module 606, a distribution extractor module 608, a simplification module 610, and a verification module 612. In some implementations, the probabilistic assertion and program module 606 can receive a program and probabilistic assertion. In some implementations, the distribution extractor module 608 can include code to transform a program and input into an intermediate representation. In some implementations, the distribution extractor module 608 can also include code to marginalize conditions to produce unconditional distributions in the intermediate representation. In implementations, the simplification module 610 can include code to simplify the intermediate representation. In some implementations, the simplification module 610 can include code to simplify the intermediate representation by replacing probabilistic distributions in the intermediate representation with simpler distributions having the same expected value as the probabilistic distribution. In some examples, the simplification module 610 can include code to further simplify the intermediate representation by simplifying comparisons using a statistical inequality. For example, the statistical inequality can be Chebyshev's inequality. In implementations, the verification module 612 can include code to verify probabilistic assertions using the simplified intermediate representation. In some implementations, the verification module 612 can include code to sample a distribution from the intermediate representation to estimate a probability using acceptance sampling to bound errors in verification. In some implementations the verification module 612 can include code to determine whether a threshold number of samples have been taken using a sequential analysis technique.

It is to be understood that any number of additional software components not shown in FIG. 6 can be included within the tangible, computer-readable storage media 600, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE 1

An example of a system for specifying and evaluating probabilistic assertions is provided herein. The example system can include a first module configured to transform a program, a probabilistic assertion, and an input into an intermediate representation. The example system can also further include a second module configured to verify a probabilistic assertion in the program by sampling the intermediate representation.

In some implementations, the intermediate representation can include a Bayesian network of nodes representing distributions. Alternatively, or in addition, the intermediate representation can also include expression trees representing probability distributions. Alternatively, or in addition, the probabilistic assertion can correspond to a probabilistic property of the program. Alternatively, or in addition, the example system can also include a third module configured to simplify the intermediate representation using one or more statistical rules. The one or more statistical rules can include a cumulative distribution function (CDF). Alternatively, or in addition, the one or more statistical rules can also include a central limit theorem. Alternatively, or in addition, the one or more statistical rules can further include a statistical inequality.

EXAMPLE 2

An example of a method for evaluating probabilistic assertions is described herein. The example method can include transforming a program, a probabilistic assertion, and an input into an intermediate representation. The intermediate representation can include a Bayesian network of nodes representing distributions. The example method can also include verifying a probabilistic assertion in the program using the intermediate representation.

In some implementations, transforming the program can include marginalizing conditions to produce unconditional distributions. Alternatively, or in addition, transforming the program can also include representing loop bodies as supernodes in the intermediate representation and marginalizing conditions to produce unconditional distributions. Alternatively, or in addition, the example method can include simplifying the intermediate representation using one or more statistical rules. Simplifying the intermediate representation can include replacing a probabilistic distribution in the intermediate representation with simpler distributions having an approximate expected value. Alternatively, or in addition, verifying the probabilistic assertion can include performing a direct evaluation of the probabilistic assertion using the simplified intermediate representation. Alternatively, or in addition, verifying the probabilistic assertion can include sampling a distribution from the intermediate representation to estimate a probability using acceptance sampling to bound errors in verification. Alternatively, or in addition, the example method can also include determining a threshold number of samples has been reached using a sequential analysis technique.

EXAMPLE 3

An example of one or more computer-readable storage media for specifying and evaluating probabilistic assertions is described herein. The example one or more computer-readable storage media can include a plurality of instructions that, when executed by a processor, can cause the processor to verify a probabilistic assertion in a program based on an intermediate representation.

In some implementations, the example computer-readable storage media can include instructions to cause the processor to transform the program, the probabilistic assertion, and an input into an intermediate representation. Alternatively, or in addition, the example computer-readable storage media can also include instructions to cause the processor to transform the program into the intermediate representation by marginalizing probabilistic conditionals to produce unconditional distributions. In addition, the example computer-readable storage media can also include instructions to cause the processor to simplify the intermediate representation into the simplified intermediate representation using one or more statistical rules. Alternatively, or in addition, the example computer-readable storage media can also include instructions to cause the processor to simplify the intermediate representation by replacing a probabilistic distribution in the intermediate representation with a simpler distribution having an approximately similar expected value as the probabilistic distribution. Alternatively, or in addition, the example computer-readable storage media can also further include instructions to cause the processor to further simplify the intermediate representation of comparisons using a statistical inequality. Alternatively, or in addition, the example computer-readable storage media can also further include instructions to cause the processor to sample a distribution from the intermediate representation to estimate a probability using acceptance sampling to bound errors in verification. Alternatively, or in addition, the example computer-readable storage media can also further include instructions to cause the processor to determine whether a threshold number of samples have been taken using a sequential analysis technique.

EXAMPLE 4

An example of a system for specifying and evaluating probabilistic assertions is provided herein. The example system can include a means for transforming a program, a probabilistic assertion, and an input into an intermediate representation. The example system can also further include a means for verifying a probabilistic assertion in the program by sampling the intermediate representation.

In some implementations, the intermediate representation can include a Bayesian network of nodes representing distributions. Alternatively, or in addition, the intermediate representation can also include expression trees representing probability distributions. Alternatively, or in addition, the probabilistic assertion can correspond to a probabilistic property of the program. In addition, the example system can include a means for simplifying the intermediate representation using one or more statistical rules. Alternatively, or in addition, the one or more statistical rules can include a cumulative distribution function (CDF). Alternatively, or in addition, the one or more statistical rules can also include a central limit theorem. Alternatively, or in addition, the one or more statistical rules can include a statistical inequality.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein can have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

In addition, while a particular feature of the claimed subject matter may have been disclosed with respect to one of several implementations, such feature can be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for specifying and evaluating a probabilistic assertion, comprising:
   a processor device element configured to execute modules;
   a first module configured to, when executed by the processor device element, transform a program comprising the probabilistic assertion and an input into an intermediate representation comprising a Bayesian network of nodes, and maintain a concrete heap and a stack instead of constructing the nodes in the Bayesian network in response to receiving non-probabilistic values, wherein the probabilistic assertion comprises a probabilistic logical statement based on random variables, a probability, and a confidence value;
   a second module configured to, when executed by the processor device element, verify the probabilistic assertion in the program by sampling the intermediate representation; and
   a third module configured to change the program to meet a desired specification or correctly express a probabilistic property of the program if the probabilistic assertion is verified as false.

2. The system of claim 1, the Bayesian network of nodes representing distributions, or expression trees representing probability distributions, or both.

3. The system of claim 1, the probabilistic assertion corresponding to a probabilistic property of the program.

4. The system of claim 1, comprising a third module configured to, when executed by the processor device element, simplify the intermediate representation using one or more statistical rules.

5. The system of claim 4, the one or more statistical rules comprising a cumulative distribution function (CDF).

6. The system of claim 4, the one or more statistical rules comprising a central limit theorem.

7. The system of claim 4, the one or more statistical rules comprising a statistical inequality.

8. A method for evaluating probabilistic assertions, comprising:
   transforming, via a processor, a program comprising a probabilistic assertion and an input into an intermediate representation, the intermediate representation comprising a Bayesian network of nodes representing distributions, wherein the probabilistic assertion comprises a probabilistic logical statement based on random variables, a probability, and a confidence value;
   maintaining a concrete heap and a stack instead of constructing the nodes in the Bayesian network in response to receiving non-probabilistic values;
   verifying, via the processor, the probabilistic assertion in the program using the intermediate representation; and changing, via the processor, the program to meet a desired specification or correctly express a probabilistic property of the program if the probabilistic assertion is verified as false.

9. The method of claim 8, wherein transforming the program comprises representing loop bodies as supernodes in the intermediate representation and marginalizing conditions to produce unconditional distributions.

10. The method of claim 8, wherein verifying the probabilistic assertion comprises performing a direct evaluation of the probabilistic assertion using the simplified intermediate representation.

11. The method of claim 8, further comprising simplifying the intermediate representation using one or more statistical rules.

12. The method of claim 11, wherein simplifying the intermediate representation comprises replacing a probabilistic distribution in the intermediate representation with simpler distributions having an approximate expected value.

13. The method of claim 8, wherein verifying the probabilistic assertion comprises sampling a distribution from the intermediate representation to estimate a probability using acceptance sampling to bound errors in verification.

14. The method of claim 13, further comprising determining a threshold number of samples has been reached using a sequential analysis technique.

15. One or more computer-readable storage media for specifying and evaluating probabilistic assertions, comprising a plurality of instructions that, when executed by a processor, cause the processor to:
  verify a probabilistic assertion in a program based on an intermediate representation comprising a Bayesian network of nodes, wherein the probabilistic assertion comprises a probabilistic logical statement based on random variables, a probability, and a confidence value;
  maintain a concrete heap and a stack instead of constructing the nodes in the Bayesian network in response to receiving non-probabilistic values; and
  change the program to meet a desired specification or correctly express a probabilistic property of the program if the probabilistic assertion is verified as false.

16. The one or more computer-readable storage media of claim 15, further comprising instructions to transform the program, the probabilistic assertion, and an input into the intermediate representation.

17. The one or more computer-readable storage media of claim 15, further comprising instructions to simplify the intermediate representation into a simplified intermediate representation using one or more statistical rules.

18. The one or more computer-readable storage media of claim 16, wherein the plurality of instructions, when executed by the processor, cause the processor to transform the program into the intermediate representation by marginalizing probabilistic conditionals to produce unconditional distributions.

19. The one or more computer-readable storage media of claim 17, wherein the plurality of instructions, when executed by the processor, cause the processor to simplify the intermediate representation by replacing a probabilistic distribution in the intermediate representation with a simpler distribution having an approximately similar expected value as the probabilistic distribution.

20. The one or more computer-readable storage media of claim 17, wherein the plurality of instructions, when executed by the processor, cause the processor to further simplify the intermediate representation of comparisons using a statistical inequality.

21. The one or more computer-readable storage media of claim 15, further comprising instructions to sample a distribution from the intermediate representation to estimate a probability using acceptance sampling to bound errors in verification.

22. The one or more computer-readable storage media of claim 21, further comprising instructions to determine whether a threshold number of samples have been taken using a sequential analysis technique.

* * * * *